United States Patent
Vigholm et al.

(10) Patent No.: US 7,610,989 B2
(45) Date of Patent: Nov. 3, 2009

(54) CONTROL SYSTEM AND A VEHICLE COMPRISING THE CONTROL SYSTEM

(75) Inventors: Bo Vigholm, Stora Sundby (SE); Lennart Strandberg, Falun (SE)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 10/904,788

(22) Filed: Nov. 29, 2004

(65) Prior Publication Data

US 2005/0146115 A1    Jul. 7, 2005

Related U.S. Application Data

(63) Continuation of application No. PCT/SE03/00842, filed on May 23, 2003.

(30) Foreign Application Priority Data

May 29, 2002    (SE) .................................... 0201604

(51) Int. Cl.
   *B62D 5/06*    (2006.01)
(52) U.S. Cl. ........................ 180/418; 180/422; 180/419; 180/421
(58) Field of Classification Search ................. 180/419, 180/422, 421, 418
   See application file for complete search history.

(56) References Cited

U.S. PATENT DOCUMENTS

| | | | | |
|---|---|---|---|---|
| 3,439,768 A | * | 4/1969 | Medley | 180/418 |
| 4,144,946 A | * | 3/1979 | Melocik | 180/442 |
| 4,505,111 A | * | 3/1985 | Okamoto et al. | 60/431 |
| 4,573,319 A | * | 3/1986 | Chichester | 60/422 |
| 4,665,698 A | * | 5/1987 | Trusock | 60/422 |
| 4,782,938 A | * | 11/1988 | Cooper et al. | 198/301 |
| 4,938,023 A | * | 7/1990 | Yoshino | 60/427 |
| 5,489,005 A | * | 2/1996 | Marcott et al. | 180/418 |
| 5,542,490 A | * | 8/1996 | Kemshall et al. | 180/422 |
| 5,778,569 A | * | 7/1998 | Schaeff | 37/410 |
| 6,158,544 A | * | 12/2000 | Dvorak et al. | 180/418 |
| 6,179,082 B1 | * | 1/2001 | Ikari | 180/418 |
| 6,505,701 B2 | * | 1/2003 | Juul et al. | 180/418 |

(Continued)

FOREIGN PATENT DOCUMENTS

DE    4314616 A1    3/1994

(Continued)

*Primary Examiner*—Lesley D Morris
*Assistant Examiner*—Marlon A Arce
(74) *Attorney, Agent, or Firm*—Novak Druce & Quigg, LLP

(57) ABSTRACT

System for controlling at least one hydraulic cylinder (2, 3) having a first control valve unit (4) connected to the hydraulic cylinder for regulation thereof. A first operable control means (5) is included and which is adapted for controlling the first control valve unit. A second control valve unit (6) is also included that is connected to the hydraulic cylinder for regulation thereof, and a second operable control means (7) is further provided and which is adapted for controlling the second control valve unit. The system also includes means (23) for prioritizing the first control means. The prioritizing means (23) is controlled via hydraulics in such a way that the effect of the second control means (6) on the regulation of the hydraulic cylinder (2, 3) is at least substantially reduced as soon as the first control means (5) is operated.

21 Claims, 6 Drawing Sheets

U.S. PATENT DOCUMENTS 6,684,975 B2 * 2/2004 Rudolph .................. 180/419

FOREIGN PATENT DOCUMENTS

| EP | 0547570 | A1 | 6/1993 |
| EP | 0636530 | A1 | 2/1995 |
| WO | WO 9845155 | A1 | 10/1998 |
| WO | WO 9955573 | A1 | 11/1999 |

* cited by examiner

CONTROL SYSTEM AND A VEHICLE COMPRISING THE CONTROL SYSTEM

CROSS-REFERENCE TO RELATED APPLICATIONS

The present application is a continuation patent application of International Application No. PCT/SE03/00842 filed 23 May 2003 which was published in English pursuant to Article 21(2) of the Patent Cooperation Treaty, and which claims priority to Swedish Application No. 0201604-6 filed 29 May 2002. Said applications are expressly incorporated herein by reference in their entireties.

FIELD OF THE INVENTION

The present invention relates to a system for controlling at least one hydraulic cylinder having a first control valve unit, which is connected to the hydraulic cylinder for regulation thereof. A first operable control means is provided which is adapted for controlling the first control valve unit, as is a second control valve unit that is also connected to the hydraulic cylinder for regulation thereof. A second operable control means is also included that is adapted for controlling the second control valve unit, and the system further comprises (includes, but is not necessarily limited to) means for prioritizing the first control means.

BACKGROUND OF THE INVENTION

Such a control system is found in, for example, various types of work vehicle comprising a front part and a rear part, which parts each have at least one wheel axle. The vehicle parts are interconnected in an articulated manner, and the parts are rotatable relative to one another around the articulation via two hydraulic cylinders arranged between the two parts.

A loading machine, such as a wheel loader or a dumper, is an example of such a work vehicle. In this case, the first control means consists of the steering wheel of the vehicle, and the second control means consists of a lever, or joystick. The invention will be described below in a case in which the control system is arranged in a loading machine for controlling its steering cylinders. This is to be regarded in no way as being a limiting example within the area of application of the invention.

Steering in a loading machine has high safety requirements. As a rule, a loading machine has normal wheel steering, but may also in parallel be equipped with lever steering. The wheel is used during transport, and the lever is used for work at lower speeds such as, for example, for loading a truck, in order to increase driver comfort.

The control system is usually designed in such a way that the driver, by means of the wheel steering, mechanically regulates a hydraulic valve which in turn transmits hydraulic energy to the steering cylinders. The lever steering also transmits hydraulic energy to the steering cylinders, but its hydraulic valve is usually controlled by electric signals; that is to say, the driver moves the lever, which in turn generates an electric signal. In some cases, it is desirable to manipulate the electric signal from the lever (ramps, maximum levels etc.), which can be effected by virtue of the signals from the lever to the hydraulic valve being transmitted via a machine computer.

The lever steering, with its electronics, is a complex system with many sources of failure. In order to increase safety, the control system can be designed so that the wheel steering has top priority; that is to say, if the steering wheel and the lever are used at the same time, it is the wheel which prevails. If an error occurs in the lever steering (for example steering takes place in spite of the lever being in a neutral position, or if the lever has locked in a certain position), the driver can use the steering wheel and thus steer the machine in a safe way. One way of carrying out prioritization is for the machine computer to receive a signal via a sensor which senses that the driver is using the wheel, the computer thus being able to suppress the control signals going out to the hydraulic valve of the lever steering. One problem with such a system is that the quality requirements for the machine computer and other electronics are very high, which results in high costs.

SUMMARY OF THE INVENTION

A primary object of the invention is to produce a control system for prioritizing a specific control means, which provides increased safety relative to known solutions. A secondary object is to produce a control system which affords opportunities for increased cost-effectiveness.

These objects are achieved by virtue of the fact that the prioritizing means is controlled via hydraulics in such a way that the effect of the second control means on the regulation of the hydraulic cylinder is at least substantially reduced as soon as the first control means is operated. In other words, the first control means is prioritized over the second control means irrespective of whether the second control means is controlling the hydraulic cylinder at the time; that is to say, irrespective of the position in which the second control means is arranged, or whether it is being moved. The control of the hydraulic cylinder is therefore transferred hydraulically from the second control means to the first control means as soon as the first control means is moved.

According to one embodiment of the invention, the prioritizing means is adapted, for prioritization, to bring the second control valve unit into a position in which its effect on the regulation of the hydraulic cylinder is at least substantially reduced, irrespective of the position of the second control means. The system therefore intervenes and hydraulically breaks the controlling connection between the second control means and the second control valve unit.

According to another embodiment, the prioritizing means is connected to the first control valve unit in such a way that prioritization is initiated when the first control valve unit is moved. This affords opportunities for simple control and a cost-effective control system.

According to another embodiment, the system comprises a pump which is adapted to be driven depending on the load to which the system is subjected. The prioritizing means also comprises a prioritizing valve which is connected hydraulically to the second control valve unit. The prioritizing valve is moreover connected to a line which is connected to the pump for controlling the prioritizing valve depending on the load. In other words, the system is load-sensing. The prioritizing valve is therefore controlled by the pressure in the line for load-sensing.

Further preferred embodiments and advantages of the invention emerge from the description below.

BRIEF DESCRIPTION OF FIGURES

The invention will be described in detail below with reference to the embodiments shown in the accompanying drawings, in which.

DETAILED DESCRIPTION OF PREFERRED EMBODIMENTS

Figure 1:
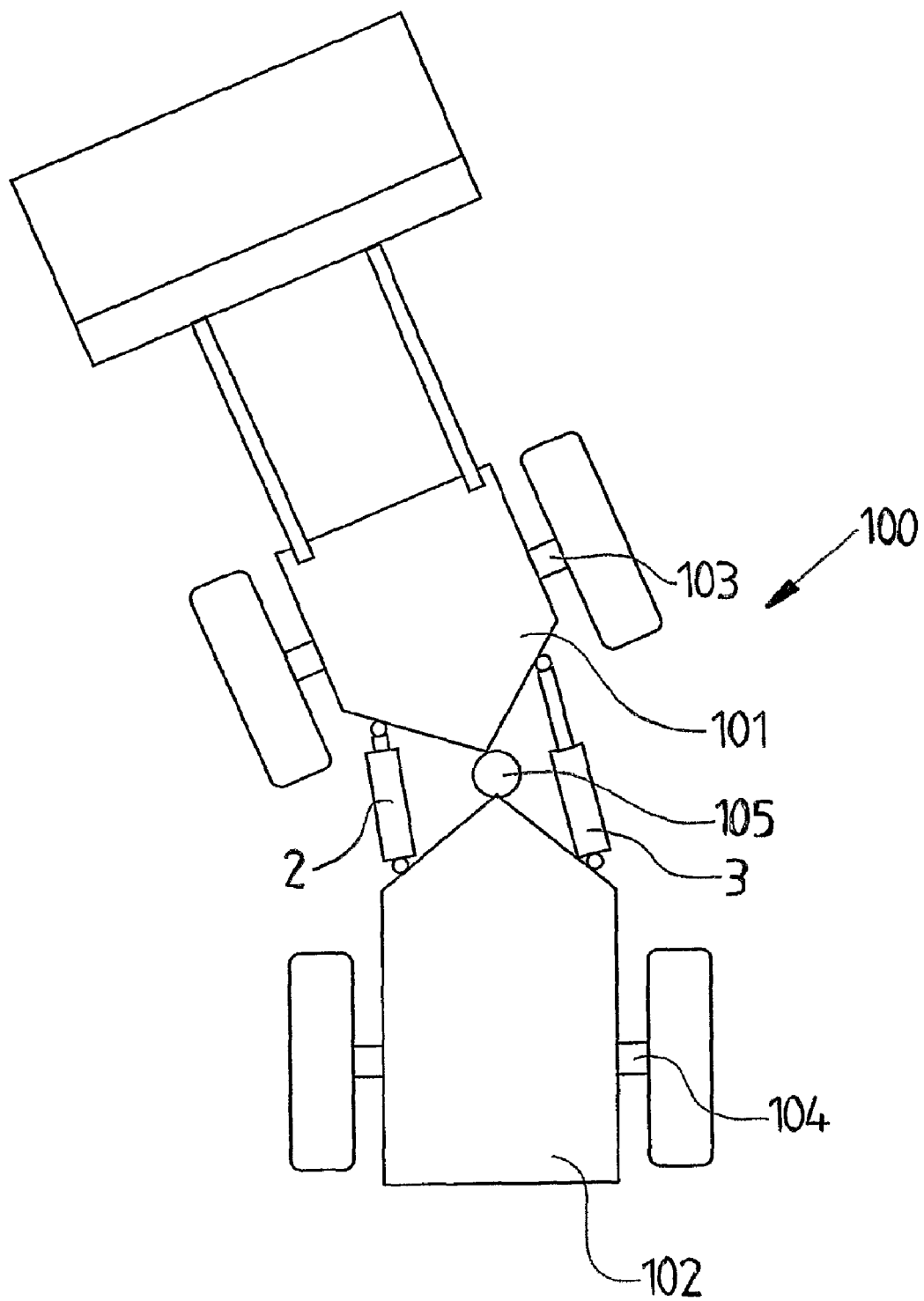
FIG. 1 is a diagrammatic view of a wheel loader taken from above.

FIG. 1 shows a diagrammatic view from above of a truck in the form of a wheel loader 100. The wheel loader 100 comprises a front part 101 and a rear part 102, which parts each have a wheel axle 103,104. The vehicle parts 101,102 are interconnected in an articulated manner, and the parts are rotatable relative to one another around an articulation 105 via two hydraulic steering cylinders 2,3 which are arranged between the two parts.

Figure 2:
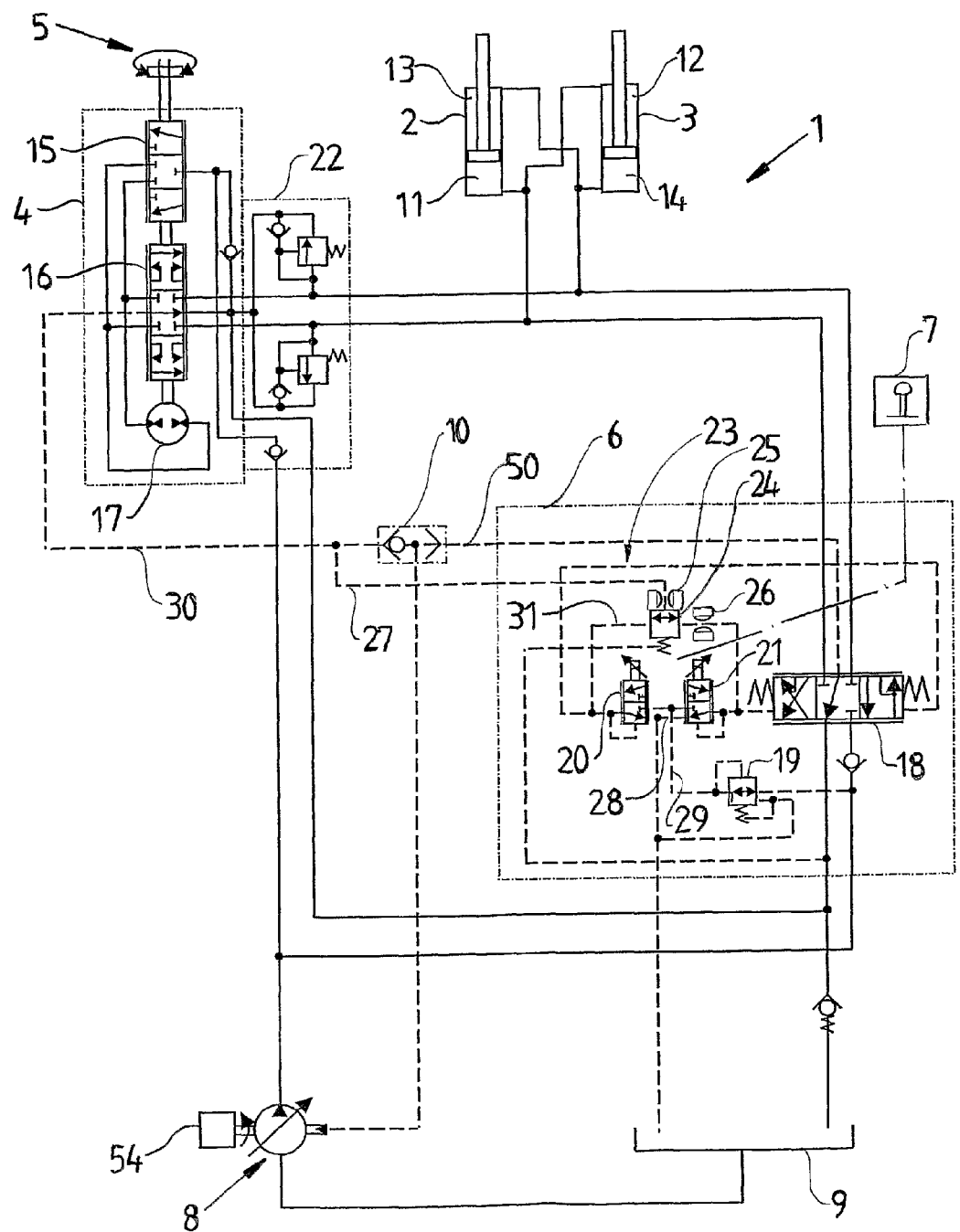
FIGS. 2-6 are schematic illustrations of five exemplary and preferred embodiments of the invention.

FIG. 2 shows a hydraulic system 1 for regulating the two hydraulic cylinders 2,3 of the wheel loader 100. The lines marked by solid lines indicate main lines, and the lines marked by dashed lines indicate pilot lines for regulating various components in the system.

The system comprises a first control valve unit 4 which is regulated mechanically by a first control means 5 in the form of the steering wheel of the vehicle. The system also comprises a second control valve unit 6 which is controlled electronically via a second control means 7 in the form of a lever. The control via the lever 7 is shown diagrammatically by a dot-dash line.

The system is load-sensing (LS) and comprises a variable displacement pump 8 and a tank 9. The pump 8 is driven by the propulsion engine 54 of the vehicle in the form of a diesel engine. The pump 8 senses the pressure (an LS signal) from the steering cylinders 2,3 via a shuttle valve 10 and via the control valve unit 4,6 which is activated. The pump then sets a pressure which is a certain number of bars higher than the pressure of the steering cylinders. This brings about an oil flow out to the steering cylinders 2,3, the level of which depends on the extent to which the activated control valve unit 4,6 is operated.

The hydraulic cylinders 2,3 are adapted in such a way that the piston side 111 of the first hydraulic cylinder 2 and the piston-rod side 12 of the second hydraulic cylinder 3 are connected to the pump 8 for steering the vehicle to the right, and the piston-rod side 13 of the first hydraulic cylinder 2 and the piston side 14 of the second hydraulic cylinder 3 are connected to the pump for steering the vehicle to the left.

The connection of the hydraulic cylinders 2,3 to the pump 8, and thus the regulation of the hydraulic cylinders can be carried out either via wheel steering by means of the control valve unit 4 or via lever steering by means of the control valve unit 6.

The first control valve unit 4 comprises two valves, or slides 15,16 that are arranged one outside the other for rotation relative to one another. In the figure, however, the slides 15,16 are illustrated diagrammatically for linear movement. The control valve unit 4 also comprises a hydraulic motor 17 which is adapted in such a way that the lower slide 16 in the figure "hunts" the upper slide 15 in order to close it. When the driver rotates the steering wheel, a certain quantity of oil is supplied to the hydraulic cylinder 2,3 which results in a certain degree of operation. The operation ends when the lower slide 16 has caught up with the upper slide 15.

The second control valve unit 6 comprises a directional valve 18 which determines the steering direction and also the control flow, and a pressure-reducing valve 19 which ensures that the pilot pressure is limited to a defined level, irrespective of the pump pressure. The control valve unit 6 also comprises two electrically controlled valves 20,21 which are regulated indirectly via an electric signal from the lever 7. The electrically controlled valves 20,21 are arranged in parallel with one another on a line 28. The line 28 is also connected to the directional valve 18 on both sides for movement thereof counter to spring force. The pump 8 is connected to the electric valves 20,21 via a line 29 which is connected to the line 28 between the electric valves. The result of this is that activation of the right-hand valve 21, via the lever 7, produces an oil pressure on the directional valve 18 for movement of the latter to the right in the figure counter to a spring force. Activation of the left-hand valve 20, via the lever 7, produces an oil pressure on the directional valve 18 for movement of the latter to the left in the figure counter to a spring force.

For steering to the right, the electrically controlled right-hand valve 21 is therefore activated, which then applies an oil pressure, which is proportional to the electric signal, to the directional valve 18. The higher the electric signal (oil pressure), the more the directional valve 18 is operated, and a greater control flow is thus obtained. For steering to the left, the electrically controlled left-hand valve 20 is therefore activated in a corresponding way.

When the control valve unit 6 is not activated, the LS signal is connected from the shuttle valve 10 (see line 50) to the tank 9 via the directional valve 18 and is thus in principle pressureless. The same applies for the first control valve unit 4, which also connects the LS signal to the tank 9 when it is not activated. The pump 8 is thus adjusted down and maintains only a low pressure. The two electrically controlled valves 20,21 are therefore arranged in such a way that activation of one valve results in movement of the directional valve 18 in one direction, and activation of the other valve results in movement of the directional valve 18 in the other direction.

In order to prevent negative pressures and pressures exceeding a defined maximum pressure in the system, the system comprises a top-up valve and a choke valve, which are indicated together by reference number 22. The function of the top-up valve and the choke valve is previously known and will therefore not be here-described in detail.

The first control valve unit 4 and the second control valve unit 6 are arranged on parallel lines between the pump 8 and the hydraulic cylinders 2,3. Depending on which control means the driver selects to steer the vehicle (that is to say, the steering wheel 5 or the lever 7), the hydraulic cylinders 2,3 are controlled by the control valve unit connected to the selected control means. The other control valve unit, which is connected to the control means which is not being used, is then in an inactive state.

The system 1 also comprises a prioritizing (prioritization) means 23 which is adapted to ensure that the wheel steering has top priority; that is to say, if the steering wheel 5 and the lever 7 are used at the same time, it is the wheel which prevails, or takes precedence. Prioritization is carried out completely hydraulically.

The prioritizing means 23 comprises a prioritizing valve in the form of a sequential valve 24 and two throttles 25,26. The sequential valve 24 is spring-loaded, and a line 27 is connected to the sequential valve 24, for opening the latter by oil pressure counter to the spring force, and to the steering cylinder 2,3 via the first control valve unit 4. When the first control valve unit 4 is in a neutral position, the sequential valve is not affected, but when the first control valve unit 4 is moved, via operation of the steering wheel 5, the sequential valve 24 is connected into the pressure of the steering cylinder 2,3 and the sequential valve then opens.

The sequential valve 24 is also arranged on a line 31 which connects the two sides of the directional valve 18. To be precise, the sequential valve is arranged in parallel with the two electrically controlled valves 20,21 and connected to a respective line out from these to the directional valve 18 in such a way that, when the sequential valve 24 is loaded with sufficiently high pressure, it opens, and the pressure on the two sides of the directional valve 18 is, to a greater or lesser extent, equalized.

The prioritization is explained in detail below. When the driver uses the steering lever 7 and effects steering to the right, an oil pressure is applied to the directional valve 18 via the electrically controlled right-hand valve 21, and the level of the oil pressure depends on the extent to which the lever 7 is operated. The other side of the directional valve 18 is drained to the tank via the electrically controlled left-hand valve 20. If, in this situation, the driver steers with the wheel at the same time, the first control valve unit 4 connects the pressure (the LS signal) of the steering cylinder 2,3 to the sequential valve 24 which then opens.

When the sequential valve 24 opens, flow takes place from one side of the directional valve 18 to its other side resulting in a certain degree of pressure equalization, and the directional valve 18 thus begins to close. How much it closes depends on the degree of pressure equalization. The degree of pressure equalization depends on how great the pilot flow is from the right-hand electric valve 21 and also the pressure drop across the throttle 26 on the line 30 for the LS signal and the left-hand electric valve 20. The degree of prioritization; that is to say, the extent to which the wheel steering is to prevail over the lever steering can be set by selection of the size of the throttle 26. The other throttle 25 forming part of the prioritizing means is arranged on the line 27 to the sequential valve 24, and the connection time (ramp) for prioritization can be set so that connection is less abrupt by selection of the size of this throttle.

The first and second control valve units 4,6 are therefore hydraulically interconnected via the prioritizing means 23 in parallel with the steering cylinders 2,3.

FIGS. 3-6 show alternative embodiments of the invention. Only the differences relative to the embodiment illustrated in FIG. 2 and described above will be described below.

According to the embodiments illustrated in FIGS. 3-6, the prioritizing means 32-35 is adapted for sensing whether flow occurs in the first control valve unit 4 for the steering wheel 5. When such a flow is registered, prioritization is activated. According to embodiments 2-5, the system comprises an element 36,37 and 44-47 which is connected to a hydraulic oil line and adapted to bring about a pressure difference on different sides of the prioritizing valve 24 for the purpose of moving the latter.

According to the second embodiment (see FIG. 3), the pressure-difference-generating element comprises a throttle 36 for bringing about a pressure difference upstream of the throttle relative to downstream of the throttle. The flow is therefore registered as a pressure drop across the throttle 36. The throttle 36 is arranged on a line 38 between the first control valve unit 4 and the tank 9; that is to say, after the control valve unit 4 (the outlet of the control valve unit) of the steering wheel 5. On both sides of the throttle 36, lines 40, 41 are connected to the line 38, which lines 40,41 are also connected to the sequential valve 24 for regulation of the latter.

A hydraulic signal for opening the sequential valve 24 is therefore sent when the first control valve unit 4 is moved into a position in which the steering cylinders 2,3 are supplied with hydraulic oil from the pump 8 via the first control valve unit 4. This embodiment means that, in order for prioritization to be initiated, there must be a flow in the port of the control valve unit 4 to the tank 9, which results in delayed operation, which means that the steering wheel has to be turned more than according to the first embodiment in order for prioritization to start. This is advantageous in cases where it is desirable that prioritization does not start simply because the driver unintentionally touches/moves the steering wheel 5.

Figure 4:
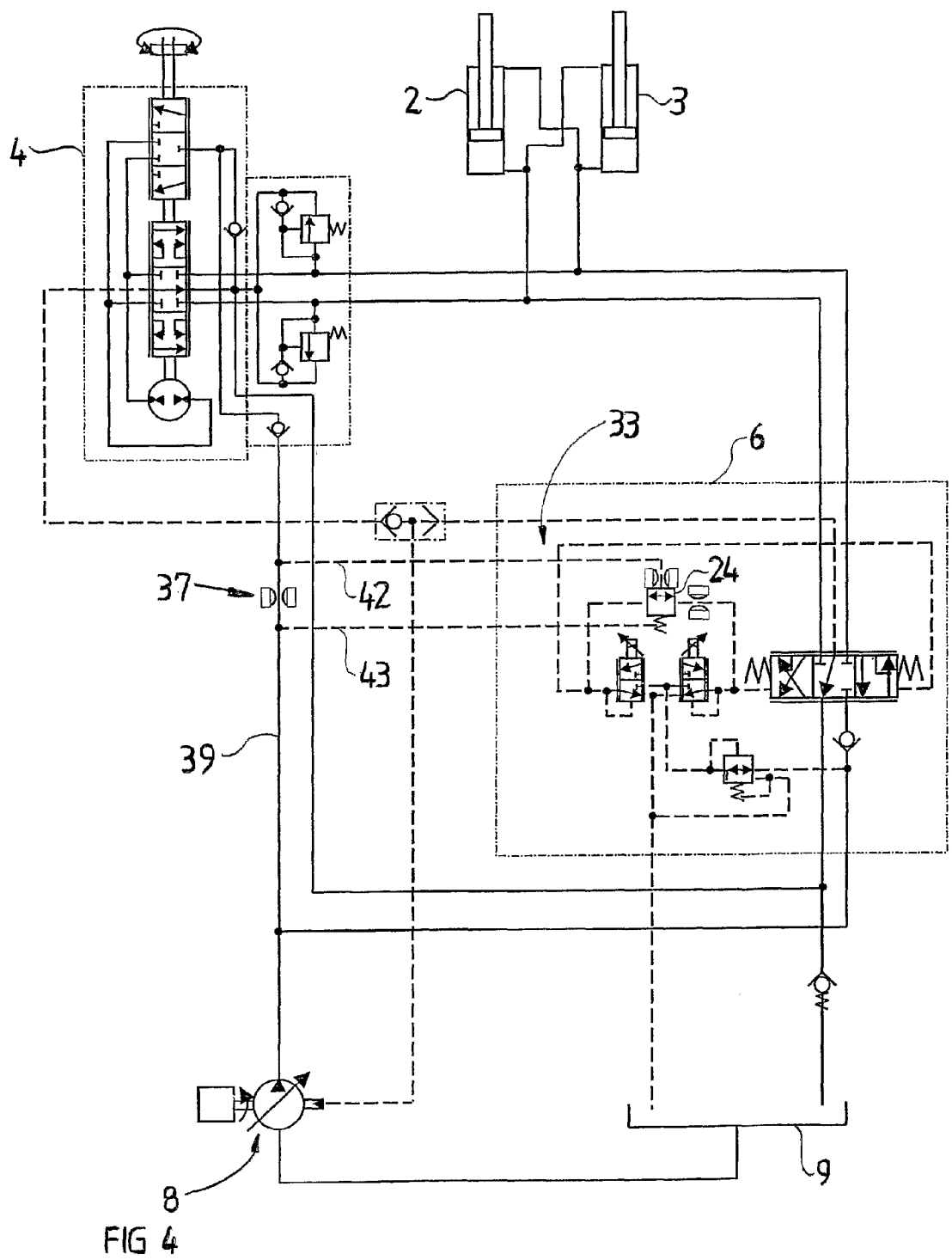

The flow is also recorded as a pressure drop across a throttle 37 according to the third embodiment (see FIG. 4). The throttle 37 is arranged on a line 39 between the pump 8 and the first control valve unit 4; that is to say, before the control valve unit 4 (the inlet of the control valve unit) of the steering wheel 5. On both sides of the throttle 37, lines 42,43 are connected to the line 39, which lines 42,43 are also connected to the sequential valve 24 for regulation of the latter. A hydraulic signal for opening the sequential valve 24 is therefore sent when the first control valve unit 4 is moved into a position in which the steering cylinders 2,3 are supplied with hydraulic oil from the pump 8 via the first control valve unit 4.

Figure 3:
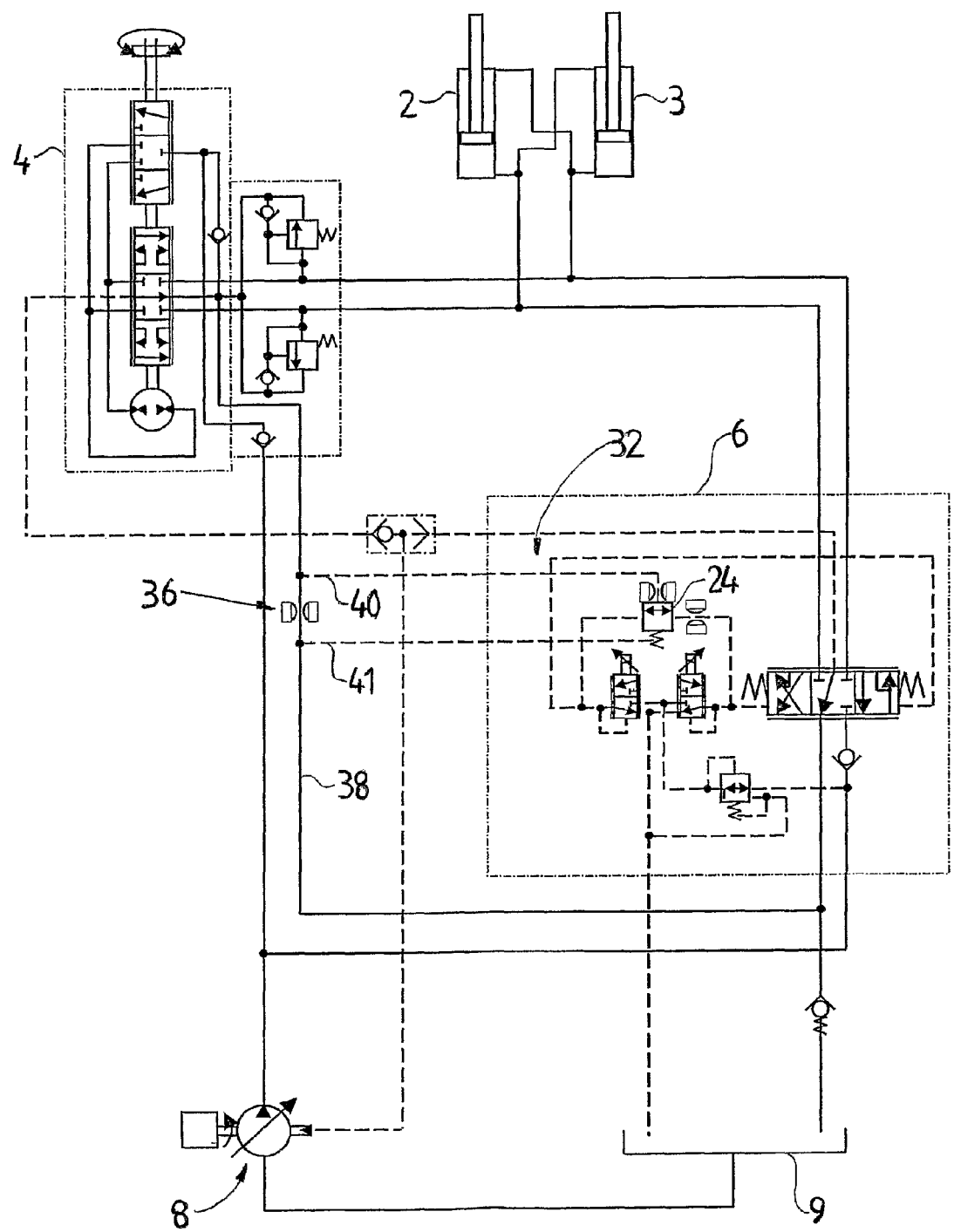
Figure 5:
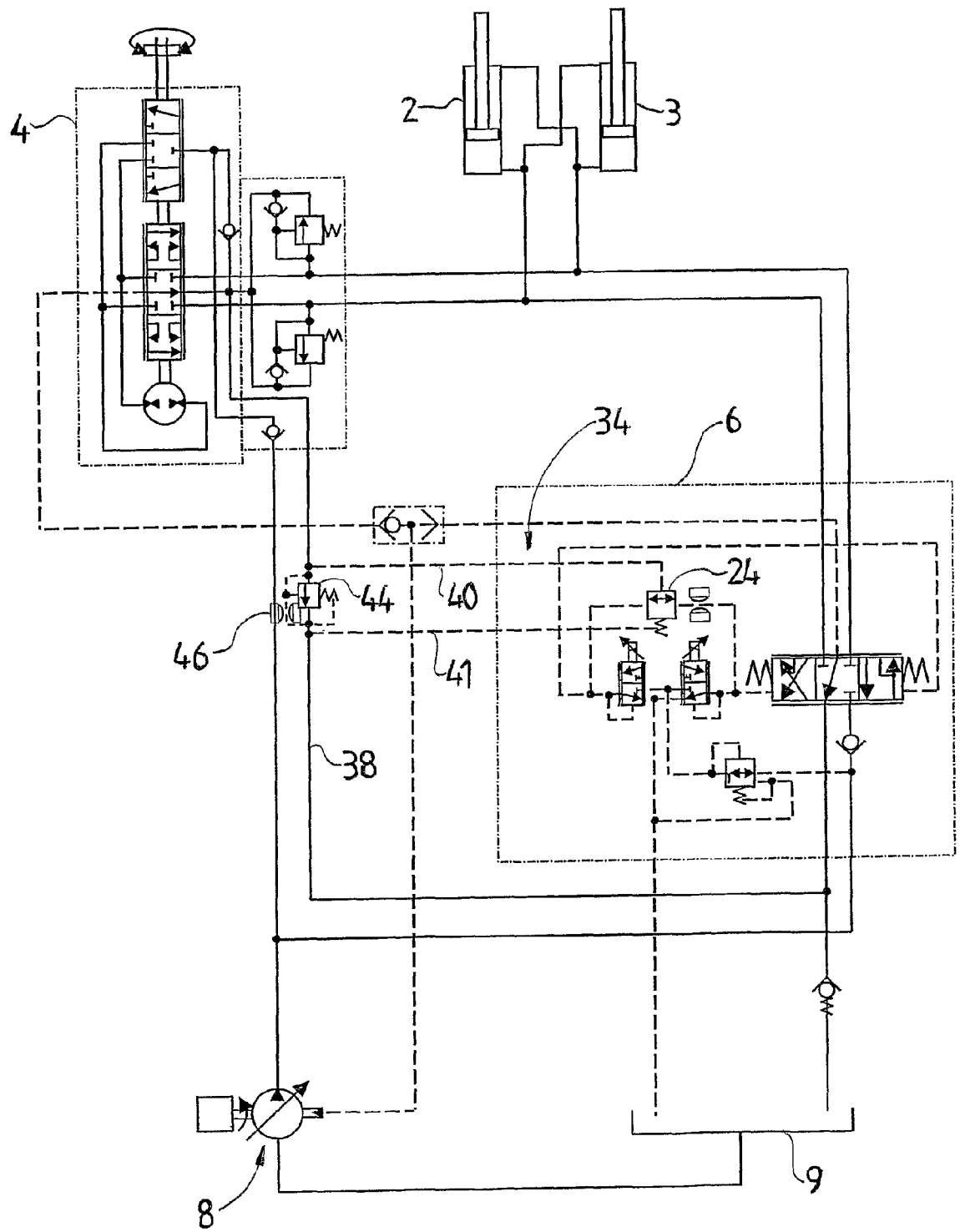

The fourth embodiment of the invention illustrated in FIG. 5 corresponds to the second embodiment illustrated in FIG. 3 with the difference that the flow is registered as a pressure drop across a valve, to be precise a back-up valve 44. The back-up valve 44 is spring-loaded and has a certain, relatively low opening pressure in order that a pressure drop will arise, which is controlled by the spring. Arranged in parallel with the back-up valve 44 is a throttle 46, the purpose of which is to equalize the pressure drop when the flow ceases.

Figure 6:
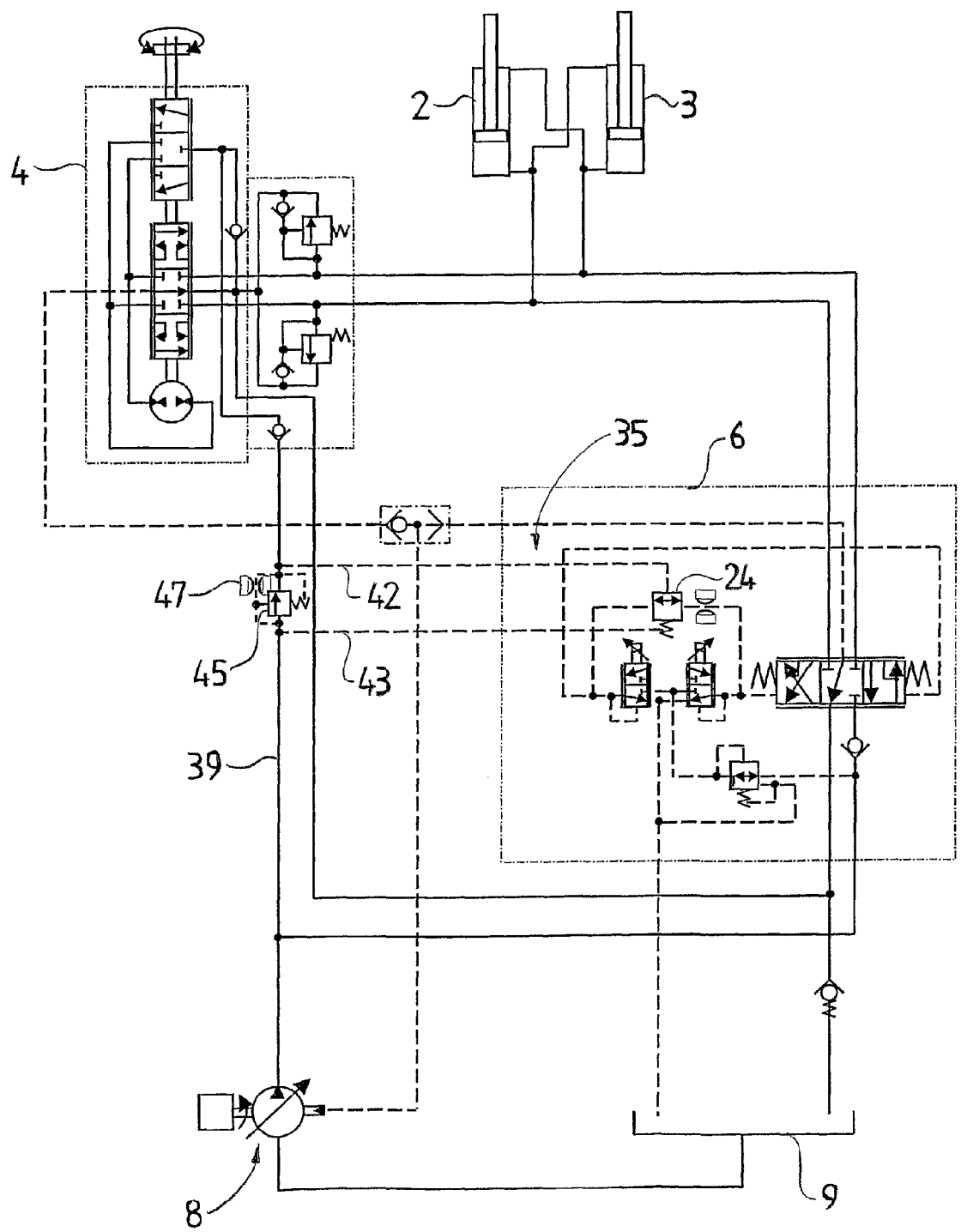

The fifth embodiment of the invention illustrated in FIG. 6 corresponds to the third embodiment illustrated in FIG. 4 with the difference that the flow is registered as a pressure drop across a valve, to be precise a back-up valve 45. The backup valve 45 has a certain opening pressure in order that a pressure drop will arise. Arranged in parallel with the back-up valve 45 is a throttle 47, the purpose of which is to equalize the pressure drop when the flow ceases.

In the fourth and fifth embodiments, use is made of a relatively small throttle 46,47 which is intended to equalize the pressure on the two sides of the back-up valve 44,45 when there is no flow through the back-up valve 44,45. Each of the back-up valves 44,45 gives a pressure drop of, for example, 3 bar. The pressure drop is in principle independent of the flow. This produces relatively small losses and affords opportunities for a system which is economical in terms of fuel. The throttle 46,47 means that a certain steering wheel speed has to be reached in order for prioritization to begin.

Depending on the selection of other components in the system, and in particular the first control valve unit 4, different solutions among those according to the five embodiments may be most advantageous.

The invention is not to be regarded as being limited to the illustrative embodiments described above, but a number of further variants and modifications are conceivable within the scope of the patent claims. In some cases, it is desirable to manipulate the electric signal from the lever (ramps, maximum levels etc.), which can be effected by virtue of the signals from lever to hydraulic valve being transmitted via a machine computer.

What is claimed is:

1. A system for controlling at least one hydraulic steering cylinder, said system comprising:
   a first control valve unit connected to said hydraulic steering cylinder for regulation thereof,
   a first manually operable control means for controlling the first control valve unit;
   a second control valve unit connected to said hydraulic steering cylinder for regulation thereof,
   a second manually operable control means for controlling the second control valve unit;

a hydraulic prioritization circuit for prioritizing said first control means over said second control means, said hydraulic prioritization circuit being controlled via hydraulics in such a way that the effect of the second control means on the regulation of the hydraulic steering cylinder is prevented by and during actuation of said first control means.

2. The system as recited in claim 1, wherein the second control valve unit comprises a directional valve that is connected to the hydraulic steering cylinder for said regulation thereof.

3. The system as recited in claim 2, wherein the prioritization circuit is configured to bring the directional valve of the second control valve unit into a position that has an effect on the regulation of the hydraulic steering cylinder that is at least substantially reduced regardless of the position of the second control means.

4. The system as recited in claim 1, wherein the prioritization circuit is connected to the first control valve unit in such a way that prioritization is initiated when the first control valve unit is moved from a neutral position.

5. The system as recited in claim 1, wherein the first and second control valve units are hydraulically interconnected via said prioritization circuit in parallel with said hydraulic steering cylinder.

6. The system as recited in claim 1, further comprising a pump that is adapted to deliver a pressure depending on a load to which the system is subjected.

7. The system as recited in claim 1, wherein the prioritization circuit comprises a prioritizing valve which is hydraulically connected to the second control valve unit for regulation of the latter.

8. The system as recited in claim 7, wherein the prioritization valve is hydraulically connected to the first control valve unit in such a way that the prioritizing valve is regulated when control of the first control valve unit takes place.

9. The system as recited in claim 1, wherein the prioritization circuit comprises a flow-sensing element which is connected to one of (a) a main line between the first control valve unit and a pump of the system and (b) a main line between the first control valve unit and a tank of the system for initiation of prioritization when there is a flow in the first control valve unit.

10. The system as recited in claim 9, wherein the flow-sensing element is configured to bring about a pressure difference on different sides of the prioritizing valve for moving the prioritizing valve and thereby constitutes a pressure-difference-generating element.

11. The system as recited in claim 10, wherein the pressure-difference-generating element comprises a throttle (36, 37) adapted for throttling the flow in the main line (38, 39) for bringing about a pressure difference upstream of the throttle relative to downstream of the throttle.

12. The system as recited in claim 10, wherein the pressure-difference-generating element comprises a spring-loaded back-up valve arranged on the main line.

13. The system as recited in claim 12, wherein the pressure-difference-generating element further comprises a throttle configured to equalize the pressure on the two sides of the back-up valve when there is no flow therethrough.

14. The system as recited in claim 7, wherein the prioritizing valve is connected to a line which is connected to a pump for controlling the prioritizing valve depending on the load.

15. The system as recited in claim 1, wherein the system comprises two hydraulic steering cylinders wherein a piston side of a first of the two hydraulic steering cylinders and a piston-rod side of a second of the two hydraulic steering cylinders are connected to a pump when one of the control valve units is arranged in a first position, and a piston-rod side of the first hydraulic steering cylinder and a piston side of the second hydraulic steering cylinder are connected to the pump when said one of the control valve units is arranged in a second position.

16. A vehicle comprising:
a front part and a rear part interconnected in an articulated manner, the parts being rotatable relative to one another around an articulation via two hydraulic steering cylinders arranged between the two parts;
a control system for controlling the relative movement of the parts, the control system comprising
a first control valve unit connected to said hydraulic steering cylinders for regulation thereof,
a first operable control means for controlling the first control valve unit;
a second control valve unit connected to said hydraulic steering cylinders for regulation thereof,
a second operable control means for controlling the second control valve unit;
a hydraulic prioritization circuit for prioritizing said first control means over said second control means, said hydraulic prioritization circuit being controlled via hydraulics in such a way that the effect of the second control means on the regulation of the hydraulic steering cylinder is prevented by and during actuation of said first control means.

17. The vehicle as recited in claim 16, wherein the vehicle is configured as a loading machine.

18. A system for controlling at least one hydraulic steering cylinder, comprising:
a first control valve unit which is connected to said hydraulic steering cylinder for regulation of the latter;
a first operable control means which is adapted for controlling the first control valve unit;
a second control valve unit which is also connected to said hydraulic steering cylinder for regulation of the latter;
a second operable control means which is adapted for controlling the second control valve unit;
means for prioritizing the first control means;
wherein the second control valve unit comprises a directional valve which is connected to the hydraulic steering cylinder for regulation of the latter; and
wherein the prioritizing means is controlled via hydraulics in such a way that the effect of the second control means on the regulation of the hydraulic steering cylinder is prevented by and during actuation of said first control means and wherein the prioritizing means is adapted, for prioritization, to bring the directional valve of the second control valve unit into a position in which its effect on the regulation of the hydraulic steering cylinder is at least substantially reduced, irrespective of the position of the second control means.

19. A system for controlling at least one hydraulic steering cylinder to provide steering to an articulated vehicle, comprising:
a first control valve unit which is connected to said hydraulic steering cylinder for regulation of the latter;
a first manually operable control means which is adapted for controlling the first control valve unit;
a second control valve unit which is also connected to said hydraulic steering cylinder for regulation of the latter;
a second manually operable control means which is adapted for controlling the second control valve unit; and means for prioritizing the first manually operable control means;

wherein the second control valve unit comprises a directional valve which is connected to the hydraulic steering cylinder for regulation of the latter; and wherein the prioritizing means is controlled via hydraulics in such a way that the effect of the second manually operable control means on the regulation of the hydraulic steering cylinder is prevented by and during actuation of said first manually operable control means and wherein the prioritizing means is adapted, for prioritization, to bring the directional valve of the second control valve unit into a position in which its effect on the regulation of the hydraulic cylinder is at least substantially reduced, irrespective of the position of the second control means.

20. A system for controlling at least one hydraulic steering cylinder, comprising:

a first control valve unit which is connected to said hydraulic steering cylinder for regulation of the latter;

a first operable control means which is adapted for controlling the first control valve unit;

a second control valve unit which is also connected to said hydraulic steering cylinder for regulation of the latter;

a second operable control means which is adapted for controlling the second control valve unit;

means for prioritizing the first control means;

wherein the second control valve unit comprises a pilot-controlled directional valve which is connected to the hydraulic steering cylinder for regulation of the latter; and wherein the prioritizing means is controlled via hydraulics in such a way that the effect of the second control means on the regulation of the hydraulic steering cylinder is prevented by and during actuation of said first control means and wherein the prioritizing means is adapted, for prioritization, to at least equalize the pressure on opposite sides of the directional valve and thereby bring the directional valve of the second control valve unit into a position in which its effect on the regulation of the hydraulic steering cylinder is at least substantially reduced, irrespective of the position of the second control means.

21. A system for controlling at least one hydraulic steering cylinder comprising:

a first control valve unit which is connected to said hydraulic cylinder for regulation of the latter;

a first operable control means which is adapted for controlling the first control valve unit;

a second control valve unit which is also connected to said hydraulic steering cylinder for regulation of the latter;

a second operable control means which is adapted for controlling the second control valve unit; and means for prioritizing the first control means;

wherein the prioritizing means is controlled via hydraulics in such a way that the effect of the second control means on the regulation of the hydraulic steering cylinder is prevented by and during actuation of said first control means; and wherein the prioritizing means for this purpose comprises a flow sensing means connected to a main line between the first control valve unit and a pump which is adapted to provide the hydraulic steering cylinder with pressurized oil, or a main line between the first control valve unit and a tank which comprises the oil, in order to initiate the prioritization upon detection of a flow in the first control valve unit.

* * * * *